(12) United States Patent
Hido et al.

(10) Patent No.: US 9,471,882 B2
(45) Date of Patent: Oct. 18, 2016

(54) INFORMATION IDENTIFICATION METHOD, PROGRAM PRODUCT, AND SYSTEM USING RELATIVE FREQUENCY

(75) Inventors: Shohei Hido, Kanagawa-ken (JP); Michiaki Tatsubori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/234,747

(22) PCT Filed: Apr. 26, 2012

(86) PCT No.: PCT/JP2012/061294
§ 371 (c)(1),
(2), (4) Date: Jan. 24, 2014

(87) PCT Pub. No.: WO2013/014987
PCT Pub. Date: Jan. 31, 2013

(65) Prior Publication Data
US 2014/0180980 A1    Jun. 26, 2014

(30) Foreign Application Priority Data

Jul. 25, 2011 (JP) ................................. 2011-162082

(51) Int. Cl.
*G06F 15/18* (2006.01)
*G06N 99/00* (2010.01)
(Continued)

(52) U.S. Cl.
CPC ........... *G06N 99/005* (2013.01); *G06F 21/552* (2013.01); *G06Q 10/10* (2013.01); *G06Q 40/08* (2013.01)

(58) Field of Classification Search
None
See application file for complete search history.

(56) References Cited

U.S. PATENT DOCUMENTS

| 2008/0086759 | A1* | 4/2008 | Colson | G06F 21/34 726/2 |
| 2011/0218948 | A1* | 9/2011 | De Souza | G06F 15/16 706/12 |
| 2012/0063641 | A1* | 3/2012 | Venkatesh | G06K 9/00771 382/103 |

FOREIGN PATENT DOCUMENTS

| CN | 1475935 A | 2/2004 |
| EP | 1376420 A1 | 1/2014 |

(Continued)

OTHER PUBLICATIONS

Ohya et al., "A Technique to Reduce False Positives of Network IDS with Machine Learning", Faculty of Science and Technology, Kelo University, vol. 45, No. 8, Aug. 15, 2004 pp. 2105-2112.

(Continued)

*Primary Examiner* — Li-Wu Chang
(74) *Attorney, Agent, or Firm* — Scully, Scott, Murphy & Presser, P.C.; Gail H. Zarick, Esq.

(57) ABSTRACT

In a case where supervised (learning) data is prepared and the case where test data is prepared, the data is recorded with time information attached to the data. The method includes clustering the learning data in a target class and clustering the test data in the target class. Then, the probability density for each of identified subclasses is calculated for each of time intervals having various time points and widths for the learning data, and is calculated for each of time intervals in the latest time period which have various widths, for the test data. Then, a ratio between a probability density obtained when learning is performed and a probability density obtained when testing is performed is obtained as a relative frequency in each of the time intervals for each of the subclasses. Input having a relative frequency that statistically and markedly increases is detected as an anomaly.

20 Claims, 10 Drawing Sheets

(51) Int. Cl.
*G06F 21/55* (2013.01)
*G06Q 10/10* (2012.01)
*G06Q 40/08* (2012.01)

(56) References Cited

FOREIGN PATENT DOCUMENTS

| JP | 2009048402 A | 3/2009 |
| JP | 2010-128674 A | 1/2014 |
| WO | WO2010111748 A1 | 10/2010 |

OTHER PUBLICATIONS

Viaene et al., "Strategies for detecting fraudulent claims in the automobile insurance industry", European Journal of Operational Research, vol. 176, 2007, pp. 565-583, Received Jul. 22, 2004; accepted Aug. 18, 2005, Available online Nov. 22, 2005.
PCT/JP2012/061294 International Search Report.
Benevenuto, et al., "Detecting Spammers and Content Promoters in Online Video Social Networks", SIGIR'09, Jul. 19-23, 2009, pp. 620-627, Boston, MA.

* cited by examiner

INFORMATION IDENTIFICATION METHOD, PROGRAM PRODUCT, AND SYSTEM USING RELATIVE FREQUENCY

CROSS-REFERENCE TO RELATED APPLICATIONS

The present invention relates to and claims the benefit of the filing date of commonly-owned, co-pending PCT Patent Application No. PCT/JP2012/061294, filed Apr. 26, 2012, which further claims the benefit of priority date of commonly-owned, co-pending Japanese Patent Application No. JP 2011-162082, filed on Jul. 25, 2011, the entire contents and disclosure of which is incorporated by reference as if fully set forth herein.

TECHNICAL FIELD

The present invention relates to information identification by means of supervised machine learning, and particularly to a technique for addressing attacks in which information is maliciously tampered with.

BACKGROUND ART

Heretofore, for example, assessments of insurance claims in insurance companies, and examinations and credit of loan and credit cards in financial companies have been essential and important tasks, and experienced experts in such companies have been in charge of these tasks. However, these days, since the number of tasks to be processed is increasing, such tasks cannot be handled in manual procedures performed by experts.

Accordingly, to reduce the load on experts, a method has been recently employed in which assessments of insurance claims and credit of credit cards are performed by means of a machine learning technique using a computer.

Information that is used for the assessments and the credit and that is sent from applicants includes yes/no answers for questions, values, such as an age and an annual income, and other descriptive text information. When such information is given on paper, predetermined operators input the information using keyboards of a computer or by means of OCR so as to convert the information into electronic formats. On the other hand, when applicants send the information to a server by means of operations on web browsers, it is not necessary to convert the information into electronic formats.

When electronic applications are collected in these ways, the experts first check each application information, and, for each application, determine acceptance/rejection and record a label for it electronically. A supervised (training) data set which has pairs each of which is constituted by a feature vector $x_i$ (i=1, ..., n) and a determination result (class label) $y_i$ (i=1, ..., n) for each piece of the application information, and which represents the determination performed in advance by the experts as described above is defined as follows.

$$D_{training} = \{(x_1, y_1), \ldots, (x_n, y_n)\}$$

Here, $y_i \in C$ where C represents a set of class labels. For example, C={0, 1} where 1 represents acceptance, and 0 represents rejection.

Figure 1:
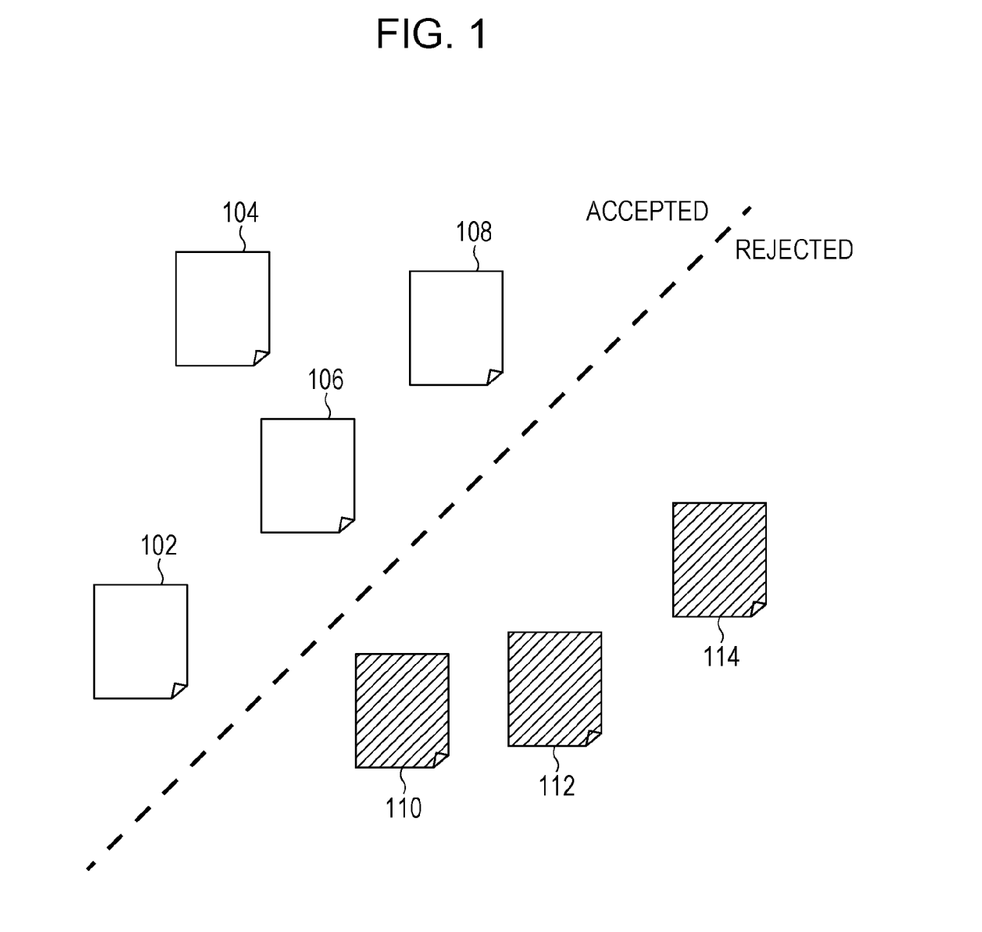
FIG. 1 is a diagram for explaining a supervised machine learning process.

An example of such training data set is illustrated in FIG. 1. That is, supervised data includes accepted (label 1) data 102, 104, 106, and 108, and rejected (label 0) data 110, 112, and 114. These pieces of data correspond to individual application.

A system of supervised machine learning configures a classifier by using this training data. The classifier corresponds to a function h such as $$h: x \to y$$

where x represents a feature vector for the application and y represents a label for the application.

Figure 2:
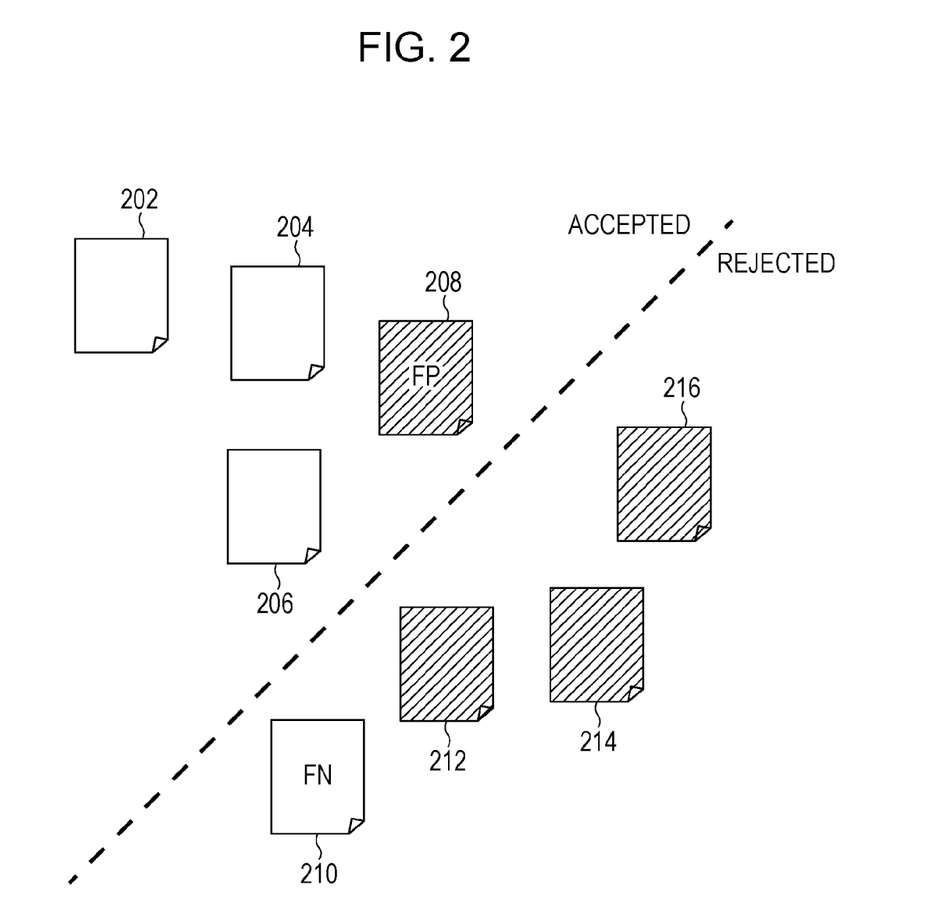
FIG. 2 is a diagram for explaining a classification process using a classifier that is configured through a supervised machine learning process.

After the classifier is configured as described above, FIG. 2 illustrates applications as test data are classified using the classifier. That is, data 202, 204, 206, and 208 are classified as accepted data, whereas data 210, 212, 214, and 216 are classified as rejected data. Here, the data 208 and 210 will be focused on. If the data 208 had been classified properly, it should have been classified as rejected data; however the data 208 has been classified as accepted data by the classifier and is called falsely accepted data (FP=false positive). If the data 210 had been classified properly, it should have been classified as accepted data; however, the data 210 has been classified as rejected data by the classifier and is called falsely rejected data (FN=false negative).

The classifier is configured on the basis of probability. Accordingly, even if any scheme of machine learning is employed, it is difficult to eradicate falsely accepted data and falsely rejected data completely.

Figure 3:
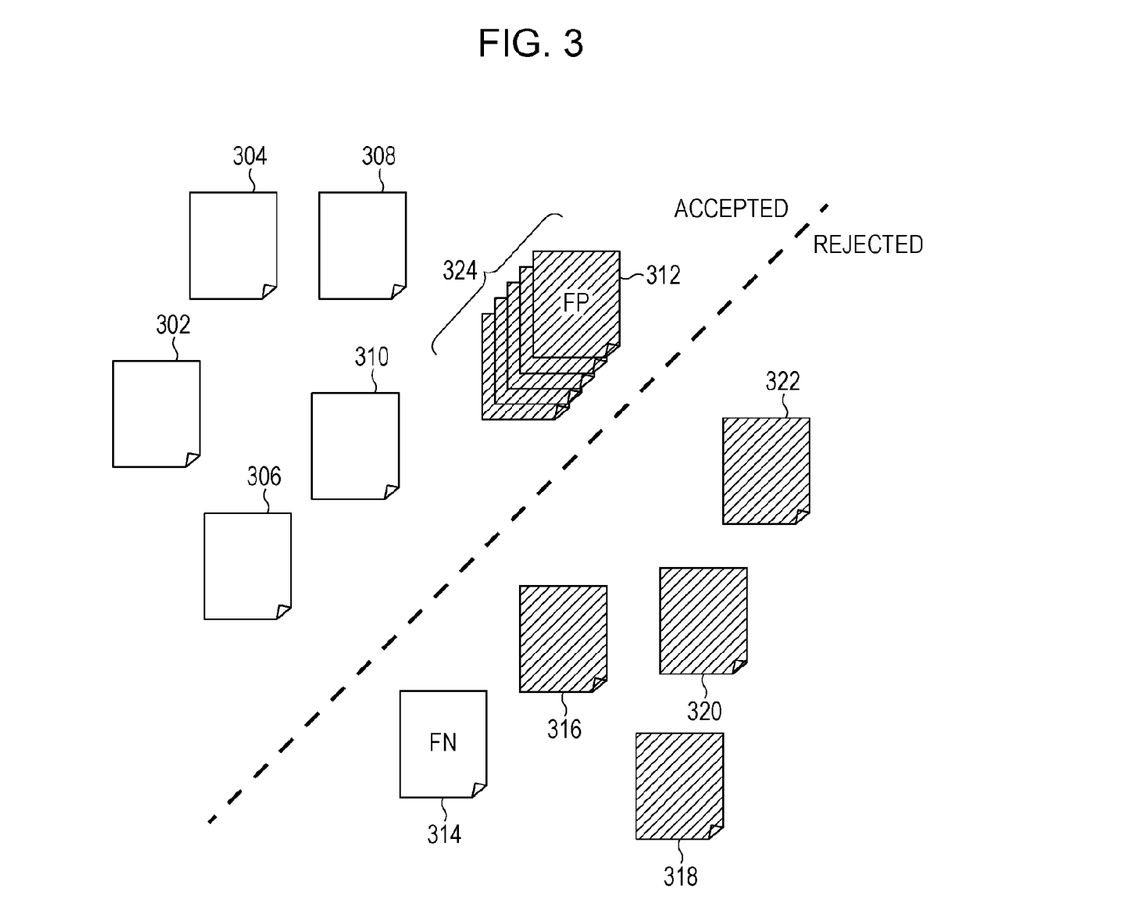
FIG. 3 is a diagram illustrating a state in which a classifier that is configured through a supervised machine learning process is attacked using falsely accepted data.

The classifier classifies test data of a sample, and the classification result is, as illustrated in FIG. 3, that data 302, 304, 306, 308, 310, and 312 are classified as accepted data, whereas data 314, 316, 318, 320, and 322 are classified as rejected data. Regarding the classification result, suppose that a malicious person finds by chance the data 312 which is falsely accepted. The malicious person may analyze the content described in the data 312, acquire knowledge, which is to be used maliciously, of which items are to be rewritten and how to rewrite these items in order to make data that is to be rejected become accepted data, and produce a manual by using the knowledge. For example, this manual may be a manual titled "how to make an insurance claim, which is far from being accepted, be easily accepted". The malicious person could sell this manual, and persons who have read the manual could create and send a series of cases that may become falsely accepted data as denoted by reference numeral 324 in FIG. 3.

Known technologies for detecting such a malicious attack are described in the following documents.

In the document, Shohei Hido, Yuta Tsuboi, Hisashi Kashima, Masashi Sugiyama, Takafumi Kanamori, "Inlier-based Outlier Detection via Direct Density Ratio Estimation", ICDM 2008 http://sugiyama-www.cs.titech.ac.jp/~sugi/2008/ICDM2008.pdf, a technique is disclosed in which an anomaly is detected by obtaining a density ratio between training data and test data.

In the document, Daniel Lowd, Christopher Meek, "Adversarial Learning", KDD 2005 http://portal.acm.org/citation.cfm?id=1081950, an algorithm in the field of spam filtering is disclosed which aims to continuously address a situation in which a single attacker carries out an attack using various techniques. The algorithm defines a distance from an ideal sample which the attacker wants to pass as an adversarial cost, and detects a sample having the minimum adversarial cost (the first sample that the attacker wants to pass among samples that can pass) and a sample having an adversarial cost that is at most k times the minimum adversarial cost, from a polynomial number of attacks.

The document, Adam J. Oliner, Ashutosh V. Kulkarni, Alex Aiken, Community Epidemic Detection using Time-Correlated Anomalies, RAID 2010 http://dx.doi.org/10.1007/978-3-642-15512-3_19, describes a technique in which in order to detect a malicious attack when a computer is subjected to the malicious attack, multiple clients are grouped under the same condition and a difference in behavior from the surroundings is calculated as a degree of anomaly. A situation in which a degree of anomaly for a single client temporarily increases may occur even in a normal case, whereas a case in which degrees of anomaly for a certain number of anomalous clients simultaneously increase indicates occurrence of an attack. This is called a time-correlated anomaly and a monitoring method for detecting a time-correlated anomaly is proposed.

The document, Masashi Sugiyama, "Kyouhenryoushifutokadeno kyoushitsuki gakushu" ("Supervised Learning under Covariate Shift") Nihon Shinkei Kairo Gakkaishi (The Brain & Neural Networks), vol. 13, no. 3, 2006, describes a discussion about how a predictive model is to be corrected in the supervised learning that is performed when training data and test data have different probability distributions. In particular, this document describes a technique in which a degree of importance is increased for training data samples that are present in an area in which test data frequently appears, so that test data is successfully classified.

According to the related art described above, a malicious attack can be detected in a certain situation. However, the related art has a problem of having a limitation that properties that are specific to data, such as data homogeneity and degrees of anomaly for individual pieces of data, are assumed. Another problem is that a degree of vulnerability can be assessed but the fact that a saturation attack is being carried out using data to be falsely accepted cannot be detected.

CITATION LIST

Non-Patent Literature

[Non-patent Literature 1] Shohei Hido, Yuta Tsuboi, Hisashi Kashima, Masashi Sugiyama, Takafumi Kanamori, "Inlier-based Outlier Detection via Direct Density Ratio Estimation", ICDM 2008

[Non-patent Literature 2] Daniel Lowd, Christopher Meek, "Adversarial Learning", KDD 2005 http://portal.acm.org/citation.cfm?id=1081950

[Non-patent Literature 3] Adam J. Oliner, Ashutosh V. Kulkarni, Alex Aiken, Community Epidemic Detection using Time-Correlated Anomalies, RAID 2010 http://dx.doi.org/10.1007/978-3-642-15512-3_19

[Non-patent Literature 4] Masashi Sugiyama, "Kyouhenryoushifutokadeno kyoushitsuki gakushu" ("Supervised Learning under Covariate Shift") Nihon Shinkei Kairo Gakkaishi (The Brain & Neural Networks), vol. 13, no. 3, 2006

SUMMARY OF INVENTION

Technical Problems

Thus, it is an object of the present invention to provide a technique allowing falsely accepted data, which is maliciously generated, to be detected with high precision, in a process of performing examinations and assessments of application documents by means of supervised machine learning.

It is another object of the present invention to prevent an extension of damage by utilizing a clue of inevitable erroneous determination, in the process of performing examinations and assessments of application documents by means of supervised machine learning.

It is yet another object of the present invention to avoid a situation in which damage occurs but is not noticed, in the process of performing examinations and assessments of application documents by means of supervised machine learning.

Solution to Problems

The present invention is made to solve the above problems. According to the present invention, in both of the case where supervised (learning) data is prepared and the case where test data is prepared, the data is recorded with time information attached to the data. This time is, for example, time at which the data was input.

Then, the system according to the present invention performs clustering on the learning data in a target class (typically, an acceptance class). Similarly, the system performs clustering on the test data in the target class (typically, the acceptance class).

Then, the system according to the present invention summarizes an identification probability density for each of the subclasses obtained by the clustering. The summarization is performed on the learning data for each of time intervals having various time points and widths, and is performed on the test data for each of time intervals in the latest time period which have various widths.

Then, the system according to the present invention obtains, as a relative frequency, a ratio between a probability density obtained when learning is performed and a probability density obtained when testing is performed, in each of the time intervals for each of the subclasses. The system detects, as an anomaly, input having a relative frequency that statistically and markedly increases, and issues an alert so that it is checked in detail whether this anomaly is caused by an attack. In other words, according to the findings of the present invention, such a case potentially indicates a high possibility that a malicious person may circumvent learning obtained by the learning data.

Advantageous Effects of Invention

According to the present invention, in a process of performing examinations and assessments of application documents by means of supervised machine learning, in both of the case where learning data is prepared and the case where test data is prepared, the data is recorded with time information attached to the data. In addition, a frequency for each of time intervals after clustering for the learning data is compared with that for the test data, thereby allowing potentially malicious data to be detected. Accordingly, malicious data can be detected with high precision without assuming properties specific to the data, such as data homogeneity and degrees of anomaly for each piece of the data, resulting in an increase in reliability of the examinations. In addition, even social liaison between attackers can be taken into account.

DESCRIPTION OF EMBODIMENT

Hereinafter, an embodiment of the present invention will be described on the basis of the drawings. Unless otherwise specified, the same reference numerals denote the same objects throughout the drawings. Note that an embodiment of the present invention will be described below and it should be understood that it is not intended that the present invention is limited to the explanation of this embodiment.

Figure 4:
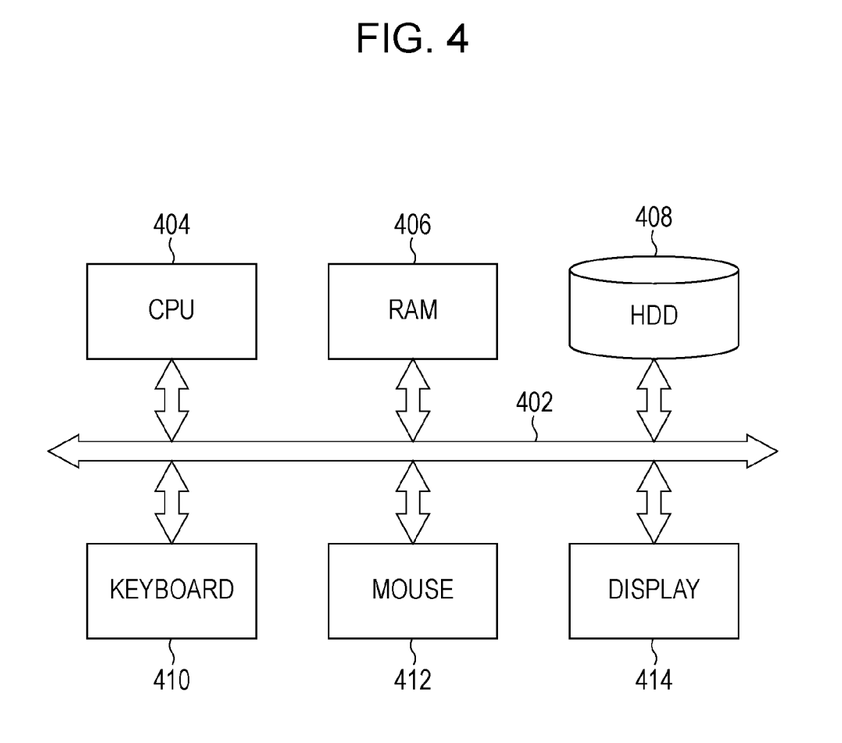
FIG. 4 is a hardware configuration block diagram for carrying out the present invention.

Referring to FIG. 4, a block diagram is shown which illustrates computer hardware for implementing a system configuration and process according to an embodiment of the present invention. In FIG. 4, a CPU 404, a main memory (RAM) 406, a hard disk drive (HDD) 408, a keyboard 410, a mouse 412, and a display 414 are connected to a system bus 402. The CPU 404 is preferably based on the architecture of 32 bit or 64 bit. For example, Pentium (trademark) 4, Core (trademark) 2 Duo, and Xeon (trademark) of Intel Corp., and Athlon (trademark) of AMD Inc. may be used for the CPU 404. The main memory 406 preferably has a capacity of 4 GB or more. The hard disk drive 408 desirably has, for example, a capacity of 500 GB or more so as to store training data and test data for a large amount of application information, such as assessments of insurance claims in an insurance company, and examinations and credit of loan and credit cards in a financial company.

The hard disk drive 408 stores an operating system in advance, which is not specifically illustrated. The operating system may be any system which is compatible with the CPU 404, such as Linux (trademark), Windows XP (trademark) or Windows (trademark) 2000 of Microsoft Corp., or Mac OS (trademark) of Apple Computer, Inc.

The hard disk drive 408 may store program language processors, such as C, C++, C#, and Java (trademark). These program language processors are used for creating and maintaining routines or tools for the processes according to the present invention as described below. The hard disk drive 408 further includes development environments, such as text editors for writing source codes to be compiled using program language processors, and Eclipse (trademark).

The keyboard 410 and the mouse 412 are used for activating the operating system or programs (not illustrated) which are loaded from the hard disk drive 408 to the main memory 406 and displayed on the display 414, and for typing characters.

The display 414 is preferably a liquid crystal display. For example, a display of any resolution, such as XGA (1024× 768 resolution) or UXGA (1600×1200 resolution), may be used for the display 414. The display 414 is used for displaying clusters including falsely accepted data which may be maliciously generated (not illustrated).

Figure 5:
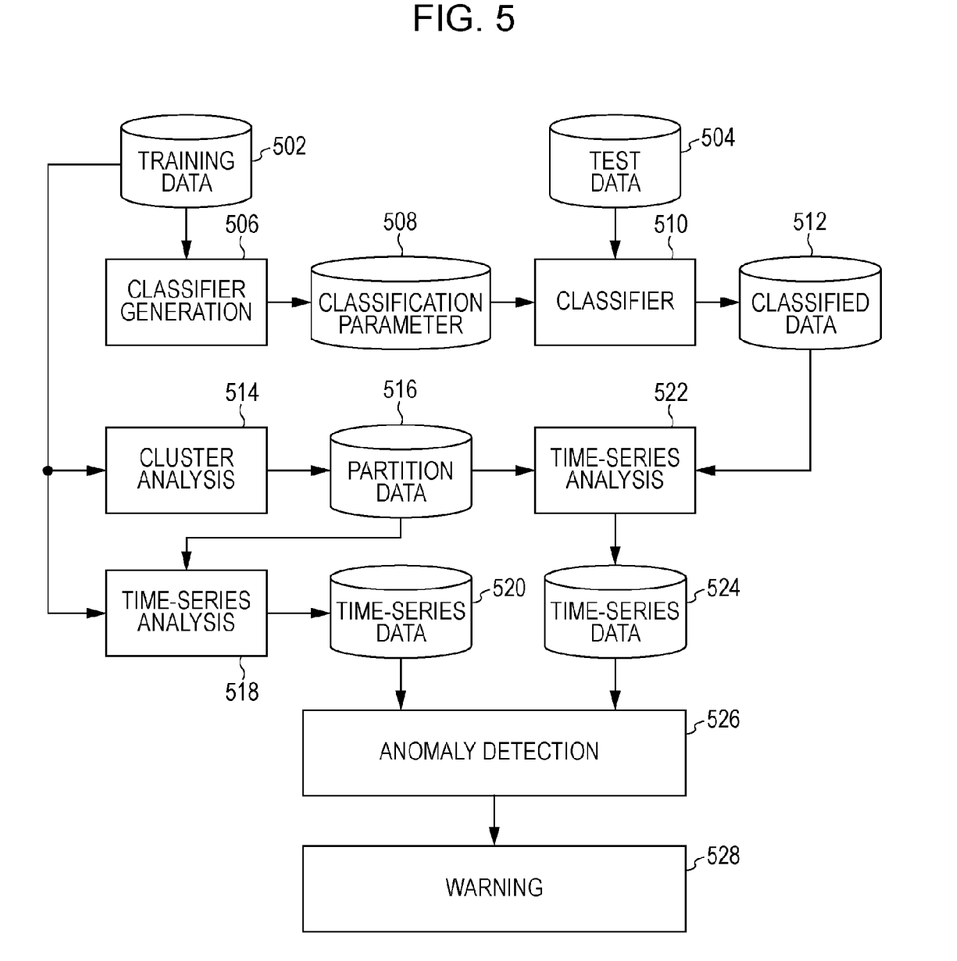
FIG. 5 is a functional configuration block diagram for carrying out the present invention.

FIG. 5 is a functional block diagram illustrating processing routines, training data 502, and test data 504 according to the present invention. These routines are written with existing program languages, such as C, C++, C#, and Java (trademark), and are stored in the hard disk drive 408 in the executable binary format. The routines are called into the main memory 406 in response to operations from the mouse 412 or the keyboard 410 and by means of functions of the operating system (not illustrated) so as to be executed.

The training data 502 is stored in the hard disk drive 408, and has the following data structure.

$$D^{(training)} = \{(x_1^{(training)}, y_1^{(training)}, t_1^{(training)}), \ldots, (x_n^{(training)}, y_n^{(training)}, t_n^{(training)})\}$$

In this data structure, $x_i^{(training)}$ represents a feature vector for the ith training data, $y_i^{(training)}$ represents a class label for the ith training data, and $t_i^{(training)}$ represents a time stamp of the ith training data. The feature vector $x_i^{(training)}$ (i=1, ..., n) is generated from items in the electronic application information, preferably, by means of a computer process automatically. When the feature vector is generated, technology such as text mining is used when necessary. The class label $y_i^{(training)}$ (i=1, ..., n) is set in accordance with the result determined by a skilled expert in charge who has checked the application information in advance. The time stamp $t_i^{(training)}$ is preferably the input date and time of the application information, and has, for example, a format of date and time.

A classifier generation routine 506 has a function of generating a classification parameter 508, which a classifier 510 uses to classify the test data 504, from the training data 502.

The test data 504 is stored in the hard disk drive 408 and has the following data structure.

$$D^{(test)} = \{(x_1^{(test)}, t_1^{(test)}), \ldots, (x_m^{(test)}, t_m^{(test)})\}$$

In this data structure, $x_i^{(test)}$ represents a feature vector for the ith test data, and $t_i^{(test)}$ represents a time stamp of the ith test data. The feature vector $x_i^{(test)}$ (i=1, ..., m) is generated from items in the electronic application information, preferably, by means of a computer process automatically. The time stamp $t_i^{(test)}$ is preferably the input date and time of the application information, and has, for example, a format of date and time.

The classifier 510 adds a class label $y_i^{(test)}$ to each piece of the test data $(x_i^{(test)}, t_i^{(test)})$ through a known supervised machine learning process. The function of the classifier 510 may be designated as a function h( ), and the expression $y_i^{(test)} = h(x_i^{(test)})$ may be used.

The known supervised machine learning is classified roughly into classification analysis and regression analysis. The supervised machine learning which may be used for the object of the present invention is in the field of the classification analysis. The techniques known as the classification analysis include linear classifiers, such as the Fisher linear discriminant function, logistic regression, the naive Bayes classifier, and the perceptron. Other than those, the techniques include a Quadratic classifier, the k-nearest neighbor algorithm, boosting, a decision tree, a neural network, a Bayesian network, a support vector machine, and a hidden Markov model. For the present invention, any technique may be selected from these techniques. However, a support vector machine is especially used according to the embodiment. For more detailed description, see Christopher M. Bishop, "Pattern Recognition And Machine Learning", 2006, Springer Verlag., for example.

The classifier 510 reads the test data 504, and adds a class label to the test data 504 to generate classified data 512 as expressed in the following expression.

$$D^{(test)} = \{(x_1^{(test)}, y_1^{(test)}, t_1^{(test)}), \ldots, (x_m^{(test)}, y_m^{(test)}, t_m^{(test)})\}$$

A cluster analysis routine 514 defines a distance, such as the Euclidean distance or the Manhattan distance, between the feature vectors of data in the training data 502, and performs clustering by means of a known technique such as K-means by using this distance so as to generate partition data 516 which is the result of the clustering. The partition data 516 is preferably stored in the hard disk drive 408. Since the partition data 516 specifies position information, such as boundaries or centers of the clusters, a determination may be made as to which piece of data should belong to which cluster, by referring to the partition data 516. In short, the partition data 516 serves as a sub-classifier. Note that the clustering technique which may be used for the present invention is not limited to K-means, and that any clustering techniques which are compatible with the present invention, such as a Gaussian mixture model, agglomerative clustering, branching clustering, and self-organizing maps may be used. Alternatively, divided data groups may be obtained by means of grid division.

The cluster analysis routine 514 writes the partition data 516, which represents the result of the clustering, into the hard disk drive 408.

A time-series analysis routine 518 reads the training data 502, calculates a data frequency and other statistical data for each of predetermined time windows for each of the clusters (subclasses) that correspond to the partition data 516, and stores the result as time-series data 520, preferably, into the hard disk drive 408.

A time-series analysis routine 522 reads the classified data 512, calculates a data frequency and other statistical data for each of predetermined time windows for each of the clusters (subclasses) that correspond to the partition data 516, and stores the result as time-series data 524, preferably, into the hard disk drive 408.

An anomaly detection routine 526 calculates data regarding a time window for a cluster for the time-series data 520 and regarding a corresponding one for the time-series data 524. The anomaly detection routine 526 has a function of activating a warning routine 528 when the result value is greater than a predetermined threshold.

The warning routine 528 has a function of displaying, for example, the cluster and the time window, in which an anomaly is detected, on the display 414 so as to notify an operator of the anomaly.

Figure 6:
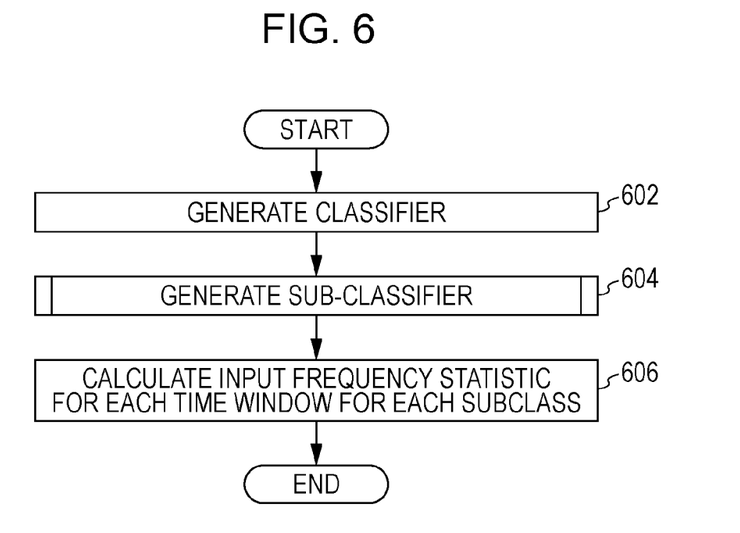
FIG. 6 is a diagram illustrating a flowchart of a training input analysis process.

Referring to flowcharts in FIGS. 6 to 9, processes which are performed will be described one by one below. FIG. 6 is a diagram illustrating a flowchart of a training data analysis process.

In step 602 in FIG. 6, the classifier generation routine 506 generates the classification parameter 508 so as to generate the classifier 510.

In step 604, the cluster analysis routine 514 generates a sub-classifier, i.e., the partition data 516 for clustering.

In step 606, the time-series analysis routine 518 calculates a statistic for input frequency for each of the time windows for each of the subclasses so as to generate the time-series data 520.

Figure 7:
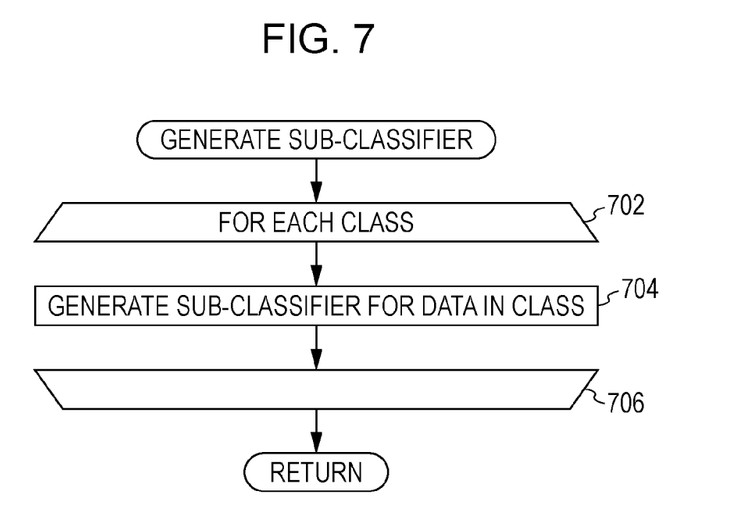
FIG. 7 is a diagram illustrating a flowchart of a sub-classifier generation process.

FIG. 7 is a diagram illustrating a flowchart describing the process in step 604 specifically. In other words, in this process, the cluster analysis routine 514 performs a loop from step 702 to step 706 on each of the classes, and generates a sub-classifier for the data in the class in step 704.

Note that, in the process of the flowchart in FIG. 7, all of the classes are not required to be subjected to the process. For example, if an attack for a certain class is to be detected, only the class may be subjected to the process.

Figure 8:
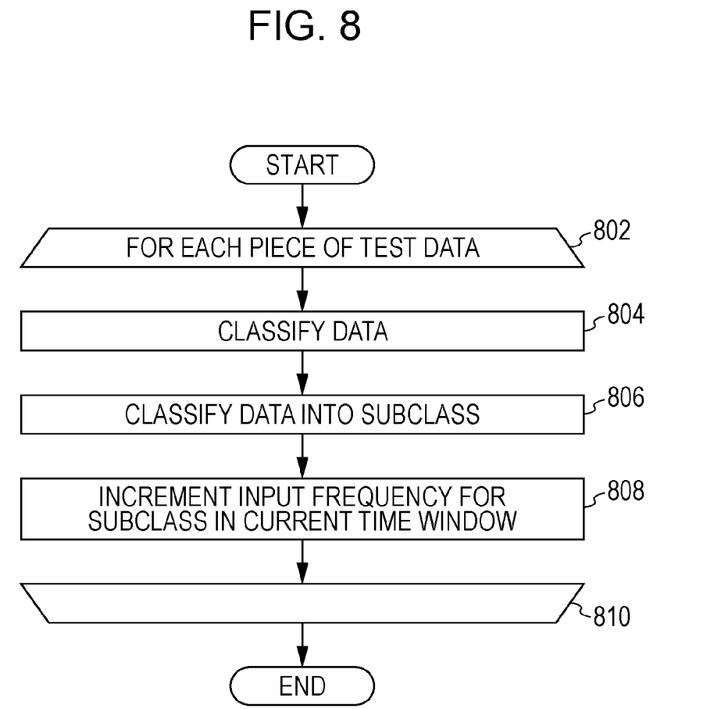
FIG. 8 is a diagram illustrating a flowchart of an analysis process on test input data.

FIG. 8 is a diagram illustrating a flowchart of an analysis process on the test data. In a loop from step 802 to step 810, all pieces of the data included in the test data 504 are subjected to the process.

In step 804, the classifier 510 classifies each piece of the data in the test data 504. Then, in step 806, the time-series analysis routine 522 classifies the classified data into a subclass (i.e., clustering) on the basis of the partition data 516. In step 808, while shifting a time window having a predetermined width, the time-series analysis routine 522 increments the input frequency for the subclass in the current time window.

When the process loop from step 802 to step 810 is completed for all pieces of the data included in the test data 504, the time-series analysis routine 522 writes the time-series data 524 into the hard disk drive 408.

Figure 9:
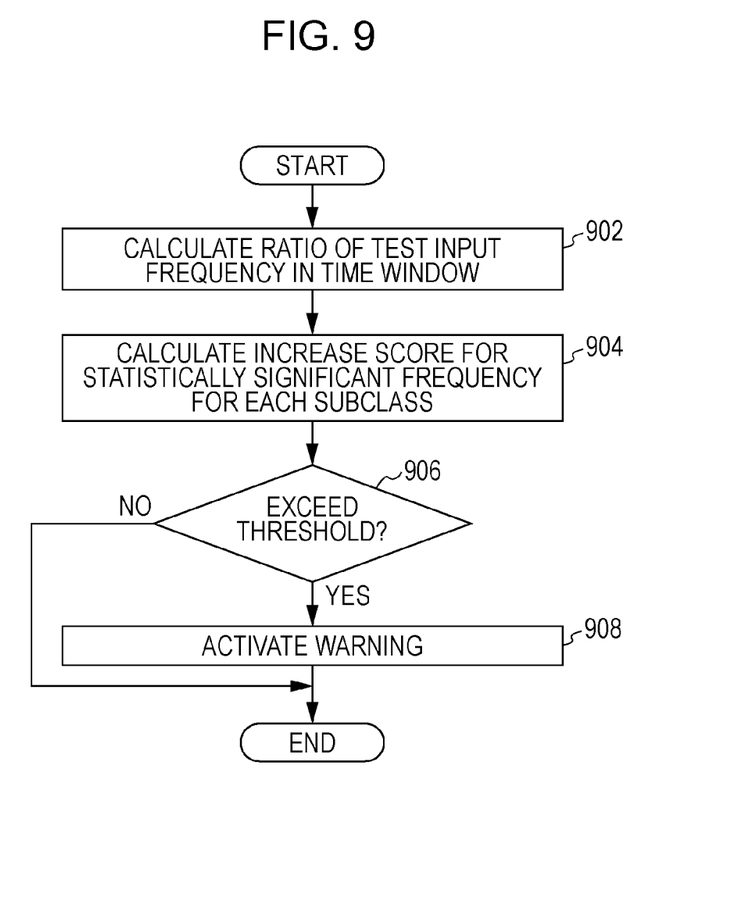
FIG. 9 is a diagram illustrating a flowchart of a frequency analysis process for each of time windows.

FIG. 9 is a diagram illustrating a flowchart of a process in which the anomaly detection routine 526 detects a possibility of occurrence of an anomaly in a predetermined time window. In step 902, the anomaly detection routine 526 calculates a ratio of a test input frequency with respect to a training data frequency in the time window.

In step 904, the anomaly detection routine 526 calculates an increase score for a statistically significant frequency for each of the subclasses. Here, the statistically significance means that a sufficient number of samples are prepared. An increase score for a significant frequency may be obtained through a simple ratio calculation. However, according to the embodiment, the following expression is used to calculate an increase score more precisely.

The width of a time window is represented by W. A function g( ) represents a function of obtaining subclasses. In the time window, a set of input feature vectors that are labeled as j at time t is expressed in the following expression.

$$X_t^{(mode)}(j) = \{x_i^{(mode)} | g(x_i^{(mode)}) = j, t - W \leq t_i^{(mode)} \leq t\} \quad \text{[Expression 1]}$$

Here, "mode" represents either of "training" that means training data, and "test" that means test data. An occurrence probability for input data having a label j is defined as follows.

$$P_t^{(mode)}(j) = P(X_t^{(mode)}(j)) \quad \text{[Expression 2]}$$

Then, the anomaly increase score is defined as the following expression.

$$q(x_k^{(test)}) = \frac{P_s^{(test)}(j)}{E(P_t^{(training)}(j))(\sigma(P_t^{(training)}(j)) + 1)} \quad \text{[Expression 3]}$$

Here, $s = t_k^{(test)}$ and $j = g(x_k^{(test)})$.

In this expression, E( ) represents an expected value, and σ( ) represents a variance.

This expression basically uses a moving average of frequencies and a variance of the moving average. Instead, frequency transformation such as wavelet transformation may be applied to take into account periodic fluctuation of a relative frequency.

In step 906, the anomaly detection routine 526 determines whether the value of the anomaly increase score described above exceeds a threshold. When the value exceeds the threshold, the warning routine 528 is activated in step 908, and information about a possibility that the subclass may be irregular is displayed on the display 414.

In this determination, when necessary, weighting may be added in accordance with the magnitude of cost for each of the samples, or natural variation may be distinguished by using tampering features which may cause an attack.

The process of the flowchart in FIG. 9 is performed for each of the time windows.

Figure 10:
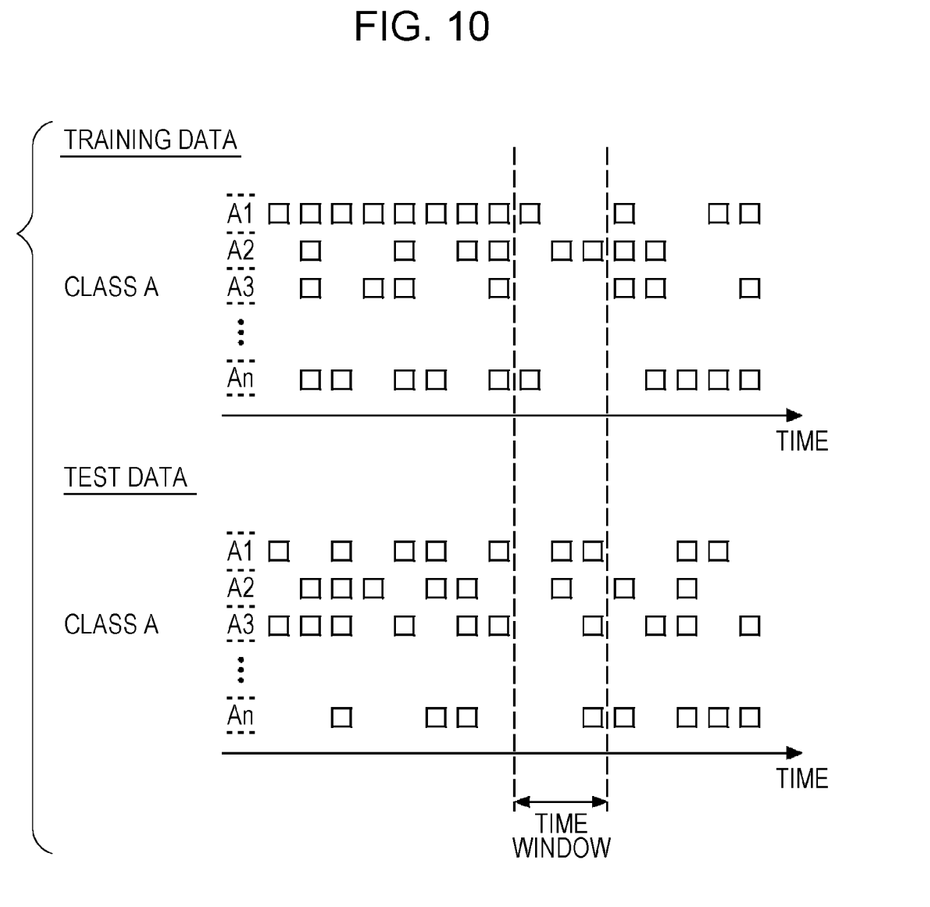
FIG. 10 is a diagram illustrating individual frequencies in subclasses for training data and test data.

FIG. 10 includes diagrams for the training data and for the test data, which illustrate data distributions along time for each of subclasses A1, A2, . . . , and An of a class A. In the process of the present invention, possibility of occurrence of an anomaly is detected by using a frequency ratio between the training data and the test data in a predetermined time window for the same subclass of the same class.

Figure 11:
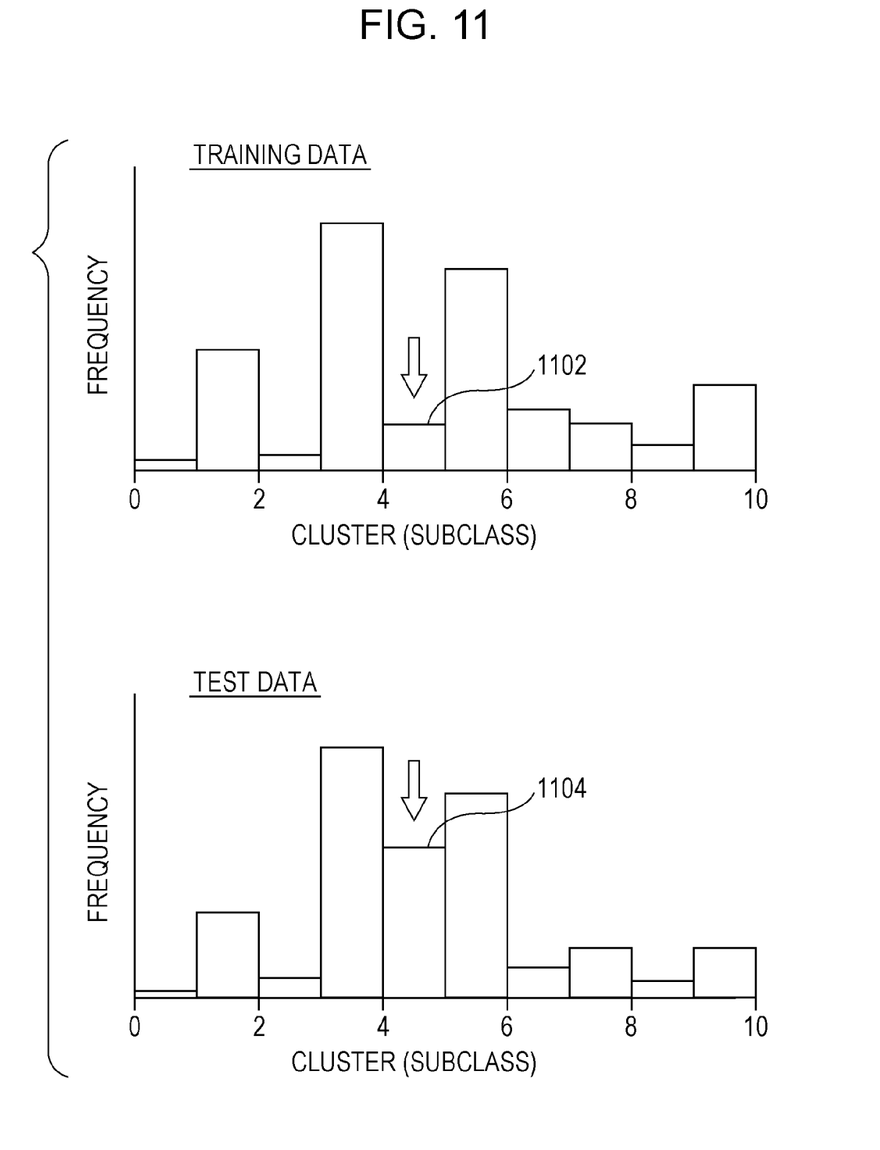
FIG. 11 is a diagram illustrating frequencies of data which may be anomalous data.

FIG. 11 illustrates an example in which such possibility of occurrence of an anomaly is detected. In other words, in a certain time interval, as denoted by reference numeral 1104, the anomaly detection routine 526 detects a state in which a frequency of the test data is substantially large with respect to a frequency of the training data in the fourth cluster (subclass), and notifies the warning routine 528 that irregular data may be present.

Through the activation of the warning routine 528, an operator is notified that the data in the cluster in the time window may have a problem, and can narrow down the data from which the problem is to be identified. Through the analysis result of the data, detected misclassification causing the attack is identified, whereby the label is temporarily modified and the data is moved into a rejection set, and an opportunity for modifying the discriminant model in the future is obtained.

In addition, during the input being subjected to recognition, by limiting the recognition to a case in which subclasses that have a characteristic of frequent appearance and that cause a large deviation of the statistic may be identified, a report may be made only when it is presumed that, for example, a manual used to circumvent the automatic recognition is present.

As described above, the present invention has been described on the basis of the specific embodiment. It should be understood that the present invention is not limited to the specific embodiment and that various configurations and techniques, such as modifications and replacements, which persons skilled in the art can obviously conceive are applicable to the present invention.

For example, according to the embodiment, the application example has been described in which the present invention is applied to examination of application documents for assessments of insurance claims in an insurance company, and for examinations and credit of loan and credit cards in a financial company. However, the present invention may be applied to any documents to be examined in which the described content can be converted into feature vectors.

REFERENCE SIGNS LIST

404: CPU
408: hard disk drive
502: training data
504: test data
506: classifier generation routine
510: classifier
514: cluster analysis routine
516: partition data
518, 522: time-series analysis routine
520, 524: time-series data
526: anomaly detection routine

The invention claimed is:

1. A computer implemented information identification method for detecting an attack carried out using irregular data against a classifier that is configured by means of supervised machine learning, the method comprising of:
preparing a plurality of pieces of training data each including a feature vector, a class label, and a time stamp of each piece of the training data;
generating the classifier by using the feature vector and the class label of the plurality of pieces of training data;
clustering the plurality of pieces of training data based on a distance between the feature vectors of the plurality of pieces of training data into a plurality of subclasses;
preparing a plurality of pieces of test data each including a feature vector, a class label, and a time stamp of each piece of the test data;
classifying the plurality of pieces of test data by using the classifier, the classifier adding the class label to each piece of the test data;
clustering the plurality of pieces of test data, which have been classified by using the classifier, into the plurality of subclasses;
for each subclass, calculating statistical data representing a ratio of a frequency of the plurality of pieces of test data clustered into the corresponding subclass and a frequency of the plurality of pieces of training data clustered into the corresponding subclass; and
warning of a possibility of occurrence of the attack, carried out using the irregular data, in one or more subclasses of the plurality of subclasses, in response to a value of the statistical data calculated for the one or more subclasses of the plurality of subclasses exceeding a predetermined threshold.

2. The information identification method according to claim 1, wherein
the feature vector is obtained by converting an answer to a question item in a financial application document into an electronic form, and the class label represents classes including an acceptance class and a rejection class.

3. The information identification method according to claim 1, wherein
the classifier is configured with a support vector machine.

4. The information identification method according to claim 1, wherein clustering the plurality of pieces of training data is performed based on a K-means algorithm.

5. The information identification method according to claim 2, wherein
the irregular data is falsely accepted data.

6. The information identification method according to claim 1, wherein
the statistical data is calculated by using a moving average of the ratio and a variance of the moving average.

7. A non-transitory storage medium readable by a processor, the storage medium storing a program of instructions executable by the processor to perform a method of detecting an attack carried out using irregular data against a classifier that is configured by means of supervised machine learning, the method comprising:
preparing a plurality of pieces of training data each including a feature vector, a class label, and a time stamp of each piece of the training data;
generating the classifier by using the feature vector and the class label of the plurality of pieces of training data;

clustering the plurality of pieces of training data based on a distance between the feature vectors of the plurality of pieces of training data into a plurality of subclasses;

preparing a plurality of pieces of test data each including a feature vector, a class label, and a time stamp of each piece of the test data;

classifying the plurality of pieces of test data by using the classifier, the classifier adding the class label to each piece of the test data;

clustering the plurality of pieces of test data, which have been classified by using the classifier, into the plurality of subclasses;

for each subclass, calculating statistical data representing a ratio of a frequency of the plurality of pieces of test data clustered into the corresponding subclass and a frequency of the plurality of pieces of training data clustered into the corresponding subclass; and warning of a possibility of occurrence of the attack, carried out using the irregular data, in one or more subclasses of the plurality of subclasses, in response to a value of the statistical data calculated for the one or more subclasses of the plurality of subclasses exceeding a predetermined threshold.

8. The information identification program product according to claim 7, wherein the feature vector is obtained by converting an answer to a question item in a financial application document into an electronic form, and the class label represents classes including an acceptance class and a rejection class.

9. The information identification program product according to claim 7, wherein the classifier is configured with a support vector machine.

10. The information identification program product according to claim 7, wherein clustering the plurality of pieces of training data is performed based on a K-means algorithm.

11. The information identification program product according to claim 8, wherein the irregular data is falsely accepted data.

12. The information identification program product according to claim 7, wherein the statistical data is calculated by using a moving average of the ratio and a variance of the moving average.

13. A computer implemented information identification system for detecting an attack carried out using irregular data against a classifier that is configured by means of supervised machine learning, the information identification system comprising:

a storage device and a processor coupled with the storage device, the processor configured to process or execute data or routines included in the storage device, wherein the storage device includes:

a plurality of pieces of training data each including a feature vector, a class label, and a time stamp of each piece of the training data, and being stored in the storage device;

a classifier generated by using the feature vector and the class label of plurality of pieces of training data;

a sub-classifier obtained by clustering the plurality of pieces of training data based on a distance between the feature vectors of the plurality of pieces of training data into a plurality of subclasses;

a plurality of pieces of test data each including a feature vector, a class label, and a time stamp of each piece of test data, and the test data being stored in the storage device, wherein the plurality of pieces of test data are classified by using the classifier, wherein the plurality of pieces of test data, which have been classified by using the classifier, are clustered into the plurality of subclasses, and wherein the classifier adds the class label to each piece of the test data;

calculation routine, for each subclass, calculating statistical data representing a ratio of a frequency of the plurality of pieces of test data clustered into the corresponding subclass and a frequency of the plurality of pieces of training data clustered into the corresponding subclass; and warning routine warning of a possibility of occurrence of the attack, carried out using the irregular data, in one or more subclasses of the plurality of subclasses, in response to a value of the statistical data calculated for the one or more subclasses of the plurality of subclasses exceeding a predetermined threshold.

14. The information identification system according to claim 13, wherein
the feature vector is obtained by converting an answer to a question item in a financial application document into an electronic form, and the class label represents classes including an acceptance class and a rejection class.

15. The information identification system according to claim 13, wherein
the classifier is configured with a support vector machine.

16. The information identification system according to claim 13, wherein
the sub-classifier uses a K-means algorithm.

17. The information identification system according to claim 14, wherein
the irregular data is falsely accepted data.

18. The information identification system according to claim 13, wherein
the statistical data is calculated by using a moving average of the ratio and a variance of the moving average.

19. The information identification method according to claim 1, wherein
the warning of a possibility of occurrence of the attack includes displaying a first time window in which the statistical data calculated for the one or more subclasses of the plurality of subclasses exceeding the predetermined threshold.

20. The information identification method according to claim 19, further comprising:

analyzing the pieces of test data in the first time window in which the statistical data exceeds the predetermined threshold; and modifying the class label of the pieces of test data of the first time window into a rejection class, in response to the pieces of test data in the first time window is determined to be misclassified.

* * * * *